Patented Apr. 1, 1924.

1,489,144

UNITED STATES PATENT OFFICE.

ZENPEI OGURA, OF NAKAJIMA-CHO, FUZAN-FU, CHOSEN, JAPAN.

PROCESS OF REFRIGERATION OF MEAT AND OTHER PROVISIONS.

No Drawing. Application filed November 28, 1923. Serial No. 677,579.

*To all whom it may concern:*

Be it known that I, ZENPEI OGURA, a subject of the Emperor of Japan, residing at No. 33, Itchome, Nakajima-Cho, Fuzan-Fu, Chosen, Empire of Japan, have invented certain new and useful Improvements in Processes of Refrigeration of Meat and Other Provisions, of which the following is a specification.

This invention relates to the process of refrigerating meat and other provisions by immersing them in a salt solution having a temperature below the freezing point of water.

The object of the invention is to provide such a method of refrigeration which may be applied to cut meat or other provisions without any deleterious effects of the salt upon the meat or other provisions, the said process being heretofore applicable only to those provisions having an outer skin such as fresh fishes.

My invention consists in treating or coating the meat or other provisions which have to be preserved, with fat, Japan wax, beeswax, mineral wax or fatty acids, or vegetable oil, or other substances which prevent the penetration of water, and then immersing them into a low temperature salt solution, the coated layer preventing the direct contact of the salt solution with the provisions.

In refrigerating food or provisions, two methods have been heretofore known, namely, salt water refrigeration and cold air refrigeration. The former method consists in immersing the provisions in a solution of table salt or some other salt solution, or a mixture of crushed ice and salt, which is kept at a temperature below the freezing point, while in the latter method the provisions are stored in a room kept at a low temperature by artificial means. Of these two methods, the former has the advantage of requiring a shorter time for freezing and a better condition of refrigeration as compared with the latter, and moreover requires a simpler installation and lower cost of operation; but it has the disadvantage that the salt penetrates into the provisions and that they acquire a bitter taste, except when the provisions consist of entire bodies which are each covered with a skin, such as fresh fishes.

Therefore the salt solution method has only a limited application namely to fishes in their complete or undivided form. With the process as per the present invention, the provisions being covered by fat or similar substances and having no direct contact with the salt solution, the salt does not penetrate into the provisions even though they remain immersed in the solution for a very long period.

In transporting beef, pork, whale and the like, it has been the general practice to keep them cool by blocks of ice, or stored in a mechanical refrigerator. When cooling the provisions with blocks of ice, though the apparatus is simple, a considerable amount of ice is needed for obtaining the desired effect, and even then a perfect result is not obtained by this method, and therefore it is not suitable for long distance transportation. In the case of the mechanical refrigerator the cooling effect is perfect, but it requires higher cost of installation and also higher running expenses; consequently it has found almost no practical use in this country, and the long distance transportation of beef, pork, etc., is considered almost impossible in most cases. When transporting whale cooled with blocks of ice, the meat will emit a bad smell from deterioration in summer and autumn and will not be adapted for use as a food, except only in the winter season. My invention may be usefully applied to such cases, by treating the meat with the salt water refrigeration process and by transporting it in a suitabe heat-insulated vessel or car, so that long-distance transportation may be effected with simpler means, at less expense, irrespective of the seasons and without a saline taste being acquired by the meat.

The meat thus treated is immersed in a dense salt water solution at about ten degrees below the freezing point, which solution is easily obtainable by adding a suitable quantity of water to a mixture of 1 part salt and 2 parts of crushed ice, or the solution may be cooled by mechanical means. The meat will be frozen without any salt penetrating into it. Although the time required for the freezing will vary according to the temperature of the salt water, the quantity of the meat treated, and the circulation of the salt water, a mass of meat of about 4 inches thick will be perfectly frozen all through in about two hours in a salt water solution of about 12 to 13 degrees below zero centigrade. Before coating the meat with fat or fatty substance, it may first be wrapped in paper or cloth, which paper or cloth will become thoroughly soaked with fat and adhere to the pieces of meat after having been dipped in the molten fat, thus preventing the fat from getting separated from the individual pieces of meat by slight shocks or concussions, and completely sealing each piece against contact with the salt solution.

In short, the salt water refrigeration which has not heretofore been applicable to provisions, except fishes in their undivided state, is by this invention made applicable to all kinds of meat and other provisions.

I claim:

1. The process of refrigerating meat and other provisions, which consists in first coating them with a fatty substance which is not penetrable by water, and then immersing them in a salt solution of low temperature.

2. A process of refrigerating meat and other provisions, which consists in wrapping them in a fibrous cover, then dipping the wrapped provisions in a substance which is not penetrable by water, and then immersing them in a salt solution of low temperature.

3. A process of refrigerating meat and other provisions, which consists in wrapping them in a fibrous cover which has first been impregnated with a fatty substance, and then freezing the wrapped mass in a cold salt water solution.

Signed at the city of Yokohama, this 5th day of November, 1923.

ZENPEI OGURA.